United States Patent
Campbell

(10) Patent No.: US 7,794,597 B2
(45) Date of Patent: Sep. 14, 2010

(54) TREATMENT OF WASTE MIXTURE CONTAINING LIQUIDS AND SOLIDS

(75) Inventor: John W. Campbell, Charlevoix, MI (US)

(73) Assignee: Big Fish Environmental, LLC, Charlevoix, MI (US)

( * ) Notice: Subject to any disclaimer, the term of this patent is extended or adjusted under 35 U.S.C. 154(b) by 0 days.

(21) Appl. No.: 12/142,582

(22) Filed: Jun. 19, 2008

(65) Prior Publication Data

US 2008/0314828 A1 Dec. 25, 2008

Related U.S. Application Data

(60) Provisional application No. 60/945,618, filed on Jun. 22, 2007.

(51) Int. Cl.
*C02F 3/00* (2006.01)
(52) U.S. Cl. .............. 210/603; 210/605; 210/609; 210/620
(58) Field of Classification Search .......... 210/603, 210/609, 620, 605
See application file for complete search history.

(56) References Cited

U.S. PATENT DOCUMENTS

| 6,776,914 B2* | 8/2004 | Hickey ............... 210/709 |
| 7,070,693 B2* | 7/2006 | Kelly ................ 210/609 |
| 2002/0043505 A1* | 4/2002 | Olson ............... 210/749 |
| 2009/0000752 A1* | 1/2009 | Dykstra et al. ...... 162/175 |

* cited by examiner

*Primary Examiner*—Chester T Barry
(74) *Attorney, Agent, or Firm*—Warner Norcross & Judd LLP

(57) ABSTRACT

A facility for treating solid and liquid waste includes a receiving station, a screening station, a preprocessing station, a press station and a processing station. The screening station is connected to an inlet capable of receiving liquid and solid waste and includes a screen for capturing at least some of the solid waste. The preprocessing station is in fluid communication with the screening station, and includes a degrit chamber for settling out an additional amount of the solids. The press station included at least one alkali mixing tank and a screw press for separating out an additional portion of the solids. The processing station includes at least one aerobic microorganism generating unit for converting nitrites into nitrogen gas and consuming carbon-based waste material.

8 Claims, 8 Drawing Sheets

TREATMENT OF WASTE MIXTURE CONTAINING LIQUIDS AND SOLIDS

BACKGROUND OF THE INVENTION

The present invention is directed to an apparatus and method for the treatment of waste, particularly for the treatment of biologically treatable waste, such as septage.

As the focus on the environment increases, so does the need for improvements in the treatment of septage and other waste. Untreated septage—the liquid and solid material pumped from septic tanks, cesspools or other sewage waste sources—may contain any number of substances toxic to humans and the environment, including solvents, noxious organic and inorganic compounds and pathogens. Proper treatment of septage to reduce the noxious compounds and pathogens, in compliance with increased regulatory requirements, must be provided in an efficient, environmentally safe, yet economical process.

Septage is commonly disposed of by a process known as land application. This process typically involves pre-treating the septage by screening out solids, stabilizing the remaining waste, or "effluent," chemically or biologically, and then applying the treated effluent to the ground by spraying, injecting or burying it. Land application is simple, cost-effective and uses relatively low energy. It also fertilizes and conditions the soil, decreasing the reliance on chemical fertilizers. Unfortunately, land application of septage suffers from a significant drawback, namely, land availability. Applying septage to land at levels that are not harmful to humans, animals or the environment require spreading it over a large area, which in many cases is unavailable or cost prohibitive.

Independent septage treatment plants have been implemented with some success. The general focus of these plants is to separate out solids (known as "biosolids"), which can be treated and used, for example, as fertilizer or energy sources, and neutralizing the remaining effluent before discharging it for land application or further treatment. These plants use such process as chlorine oxidation, aerobic and/or anaerobic biological treatment and other chemical treatment. Biological treatment including aerobic or anaerobic bacteria can be effective at reducing the amounts of harmful ammonia and nitrates in the septage. Physical means such as presses are also often used to dewater the septage. Some septage treatment plants also use alkali such as lime to condition and stabilize the septage before it is dewatered. The lime raises the pH of the septage, which reduces the attraction of vectors (rodents, birds, insects and other organisms that can transport pathogens) and helps to separate the solids from the liquids.

One such septage treatment plant is described in U.S. Pat. No. 7,070,693 to Kelly. Kelly discloses a septage processing facility that provides septage treatment in a series of steps. The steps include (1) screening and grinding the raw septage, (2) transferring the remaining effluent into large 13,000 gallon tanks; (3) pasteurizing the effluent in large batches of 10,150 gallons using a 300 horsepower boiler; (4) cooling the pasteurized effluent into cooling tanks where a floatable re-entrainment device removes floatable materials remaining in the effluent; (5) adding lime to the effluent sufficient to raise the pH to at least 12 for two hours and at least 11.5 for an additional 22 hours (per federal regulations); (6) pressing the lime septage mixture in a filter press to further dewater the mixture; (7) biologically treating the effluent in aerobic and anaerobic tanks; (8) clarifying the waste stream by running it through a sand filter system; and (9) treating the sand filtered waste stream by a UV disinfection system. Unfortunately, the Kelly process suffers from a number of inefficiencies. First, a large amount of energy is necessary to heat 10,125 gallons of liquid septage to 158 degrees, as required in the Kelly pasteurization step. Second, because the Kelly process pasteurizes such a large amount of material, it must then transfer that amount of material to cooling tanks and then on to the filter presses, requiring additional energy and increased area. In addition, the anaerobic treatment process requires the addition of large amounts of carbon dioxide, and also produces methane gas, which would make it difficult to safely house the system in an enclosed structure.

SUMMARY OF THE INVENTION

The present invention provides a waste treatment facility having an efficient and effective system for treating solid and liquid waste. In one embodiment, the facility is an enclosed facility that includes a receiving station, a screening station, a preprocessing station, a press station and a processing station. The screening station is connected to an inlet capable of receiving liquid and solid waste, and it includes a screen for capturing the majority of the inorganic solid waste. The preprocessing station is in fluid communication with the screening station, and includes a degrit chamber for settling out an additional amount of the solids. The press station includes at least one alkali mixing tank and a screw press for separating out an additional portion of the solids. The processing station includes at least one aerobic microorganism generating unit for converting nitrites into nitrogen gas and consuming carbon-based waste material.

In another embodiment, the system additionally includes a biofilter connected to various stations, such as the processing station and the preprocessing station, for treating the gases from these stations before exhausting them into the atmosphere. The system may additionally include a biomass concentrator reactor for removing an additional amount of the solids and biological removal of those solids.

In another embodiment, the system is housed in a single, enclosed facility, with an entrance and an exit for a waste removal vehicle. At least some of the stations, such as the preprocessing station, the alkali mixing station and the processing station, may be in tanks that are buried underneath the floor of the facility to maximize the floor space and create a compact footprint. The tanks may include ventilation ports below the floor and connected to the biofilter for collecting the gases within the tanks and removing the gases from the building.

The system may additionally include a discharge station for transferring the treated waste out of the facility, for instance, to a wastewater treatment plant or for land application. In one embodiment, the discharge station is also connected to various components of the system, such as the press system and the screening system, to recycle the treated liquid waste into the system.

The present invention also includes a method for treating liquid and solid waste, including: screening the waste to remove an initial amount of the inorganic solids; settling the heavier waste in a degrit chamber; stabilizing the waste in an alkali mixing tank by adding an alkali to the waste to raise the pH to a predetermined level; pressing the stabilized waste in a screw press to remove an amount of the solids and heat the material to around 72 degrees Celsius; processing the waste by flowing the waste through at least one microorganism generating unit; and discharging the processed waste.

DETAILED DESCRIPTION OF THE CURRENT EMBODIMENT

Figure 1:
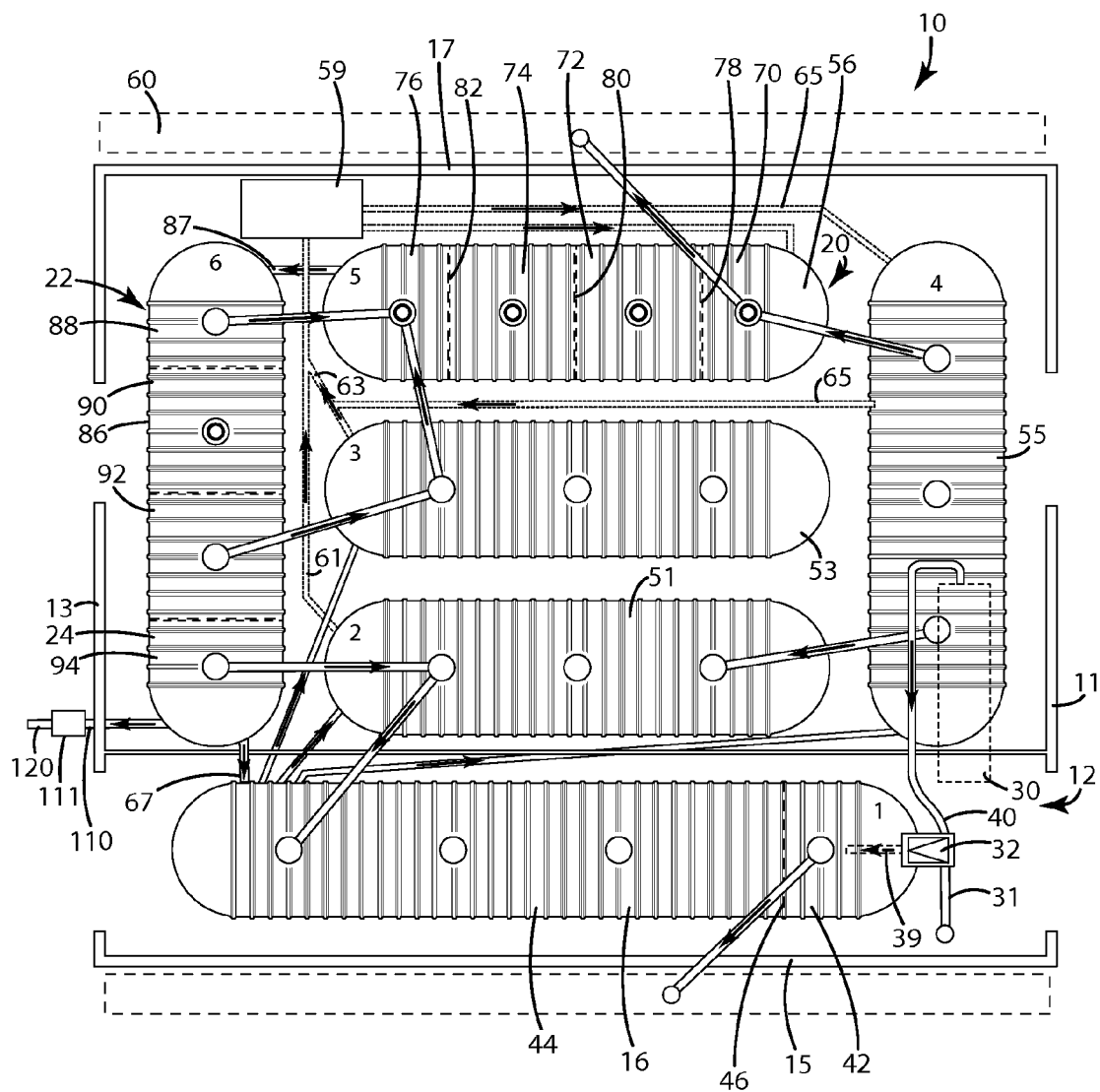
FIG. 1 is a plan view of a waste treatment system according to one embodiment of the present invention.
Figure 2:
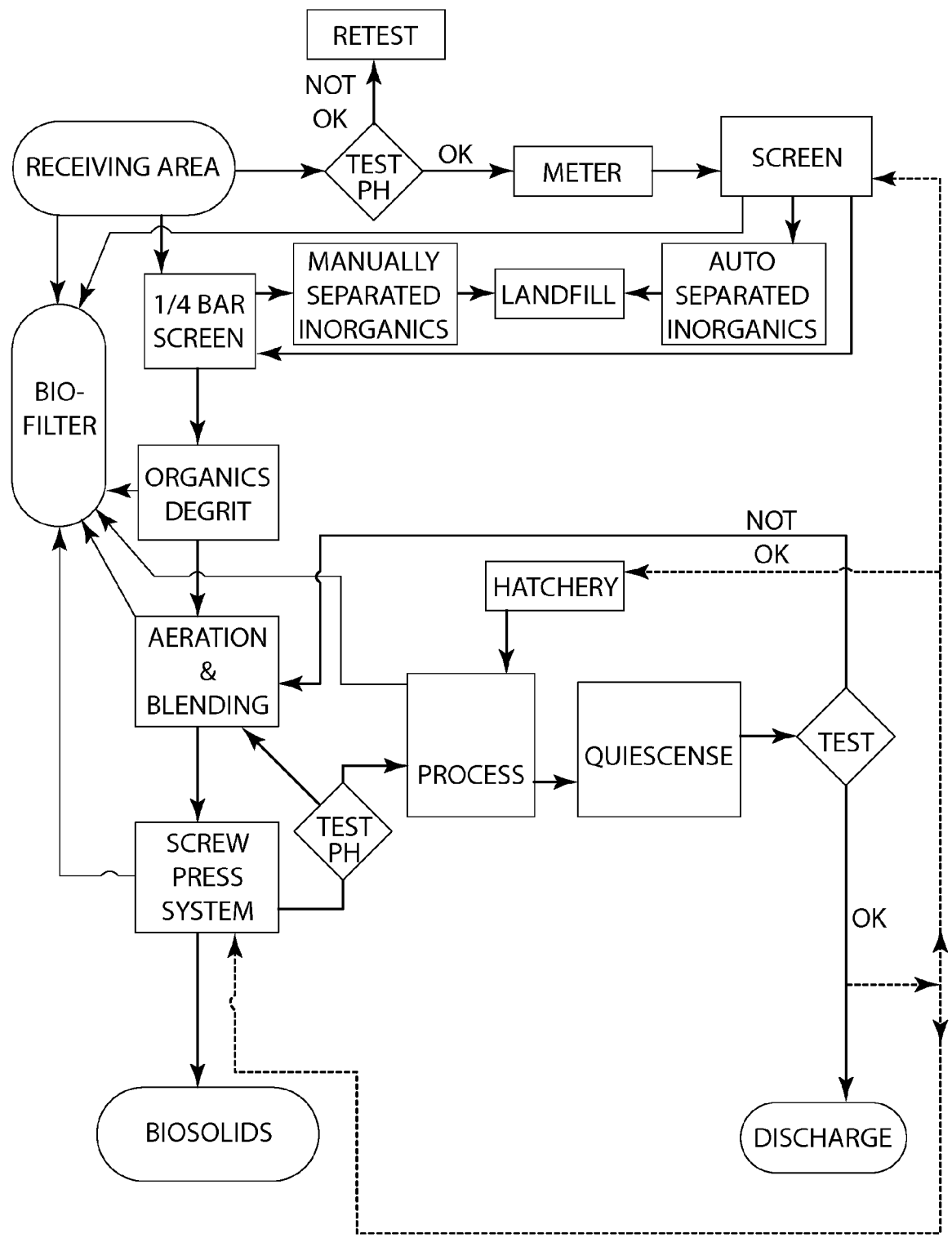
FIG. 2 is a process flow diagram of the waste treatment facility according to one embodiment of the present invention.
Figure 3:
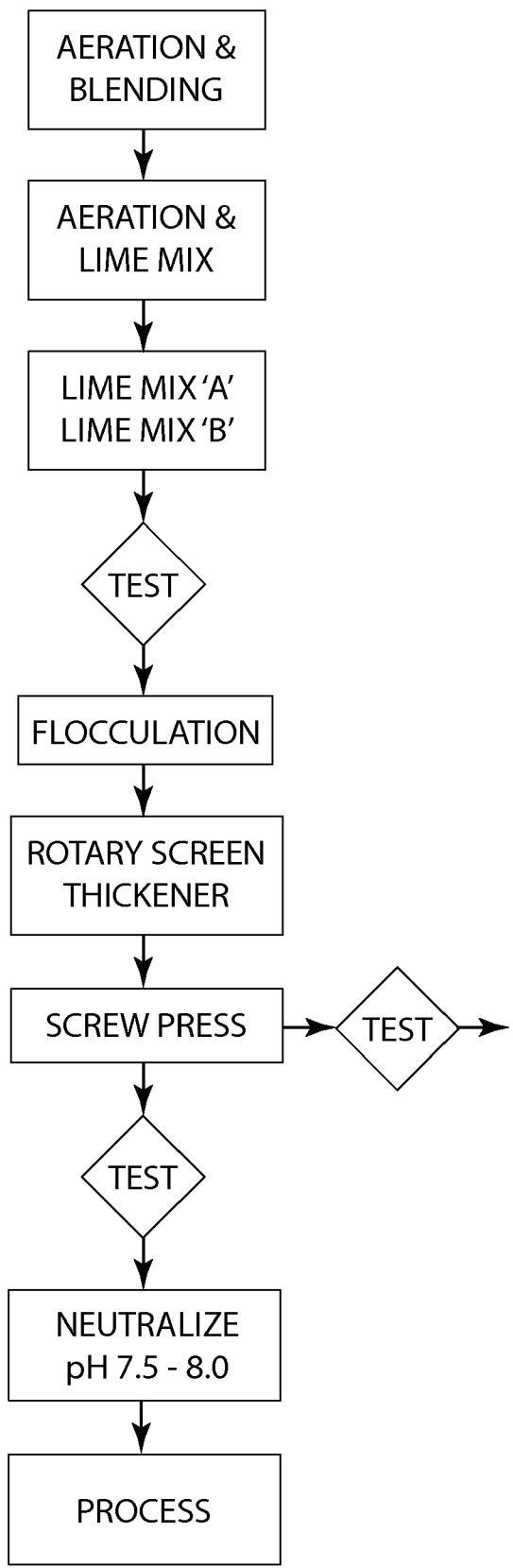
FIG. 3 is a process flow diagram of the screw press station according to one embodiment of the present invention.

A waste treatment facility according to one embodiment of the present invention is shown in FIG. 1 and generally designated 10. In general, the waste treatment facility 10 provides an apparatus and method for treating waste, such as septage, sewage, fats, oils, greases and other organic and inorganic materials in liquid or solid form. The facility 10 generally includes a receiving station 12, a screening station 30, a preprocessing station 16, an alkali mixing station 51, 53, 55, a screw press station 59, a processing station 20, a quiescent station 22, and a discharge station 24.

Figure 7:
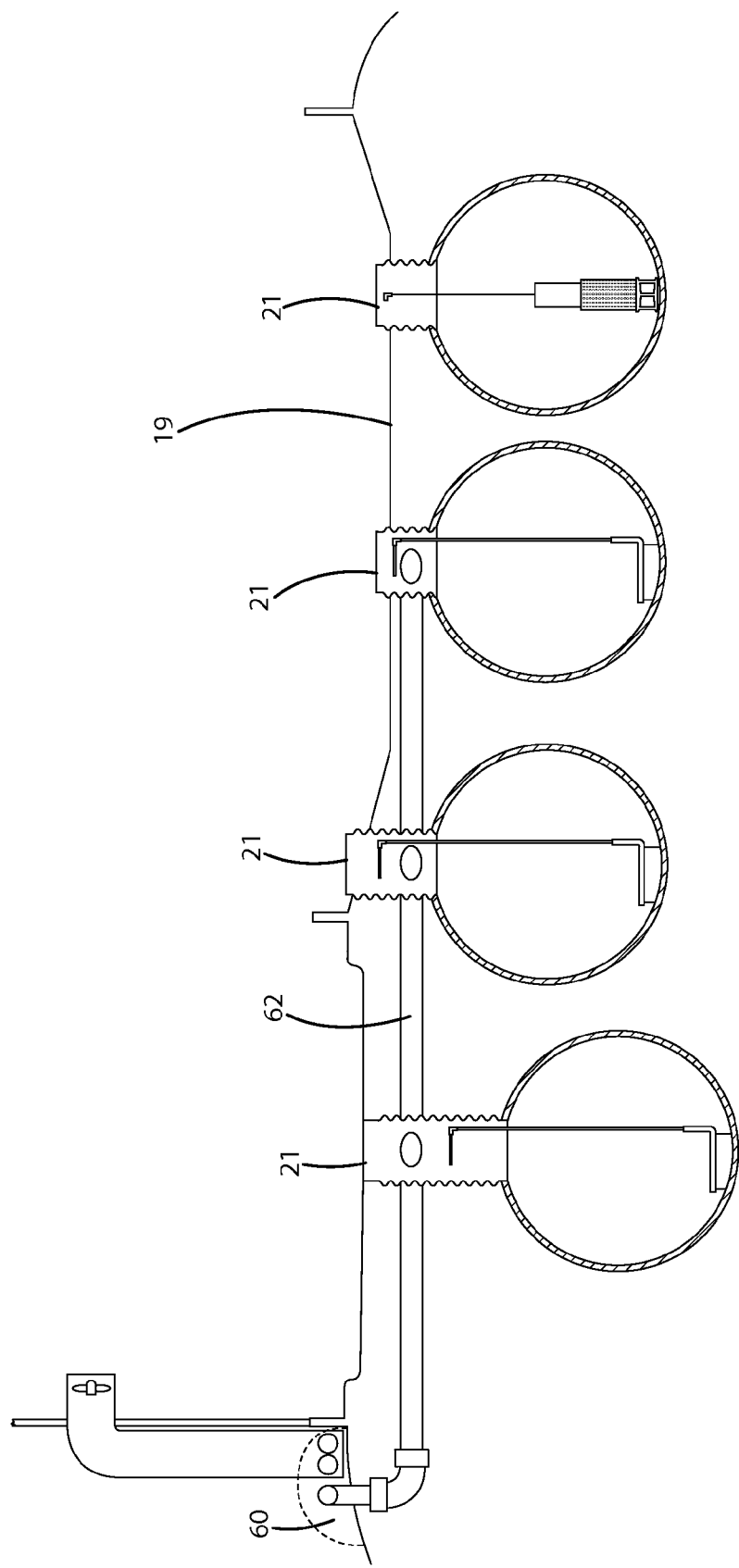
FIG. 7 is a side cross-sectional view of the tanks according to one embodiment of the present invention.

In one embodiment, the entire facility 10 is designed to be housed in a single enclosed, or substantially enclosed, building. As illustrated, the facility 10 has a relatively compact 4,320 square foot, fully contained footprint with front 11 and rear 13 walls and opposing side walls 15, 17. As illustrated, for instance, in FIG. 7, the facility 10 includes a floor 19. In one embodiment, at least a portion of the stations are substantially buried under the floor 19. For instance, as shown in FIG. 7, the tanks (described below) of the preprocessing station 16, alkali mixing station, processing station 20, quiescent station 22 and discharge station may be buried below the floor 19 of the facility with ventilation ports 21 extending outwardly under the surface of the floor 19 to the biofilters 60.

Figure 4:
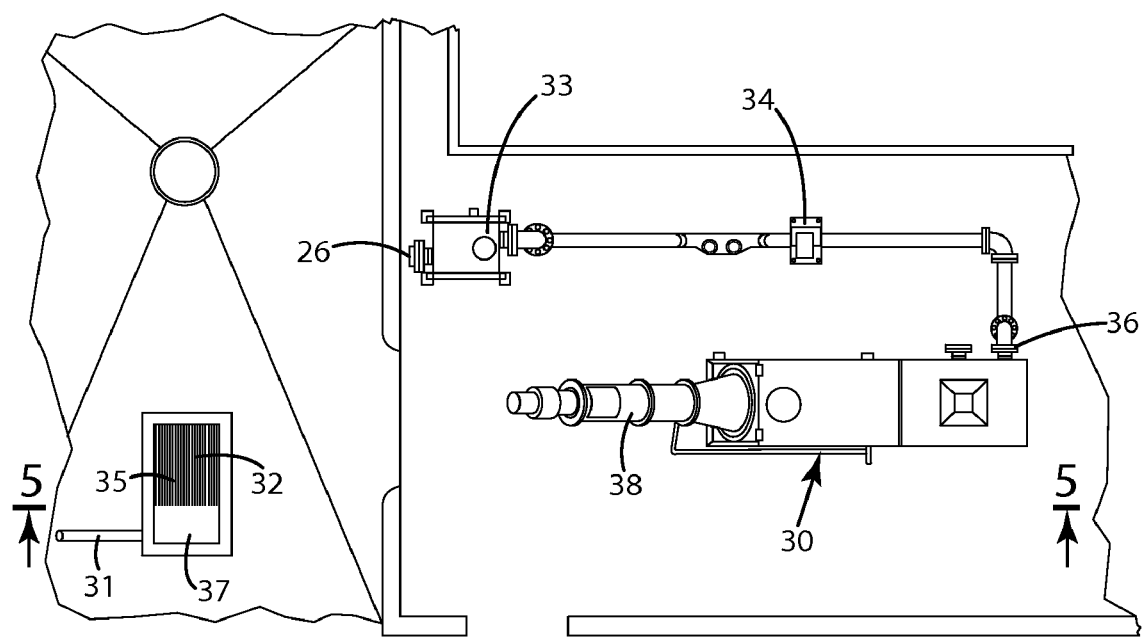
FIG. 4 is a top view of the screening station according to one embodiment of the present invention.
Figure 5:
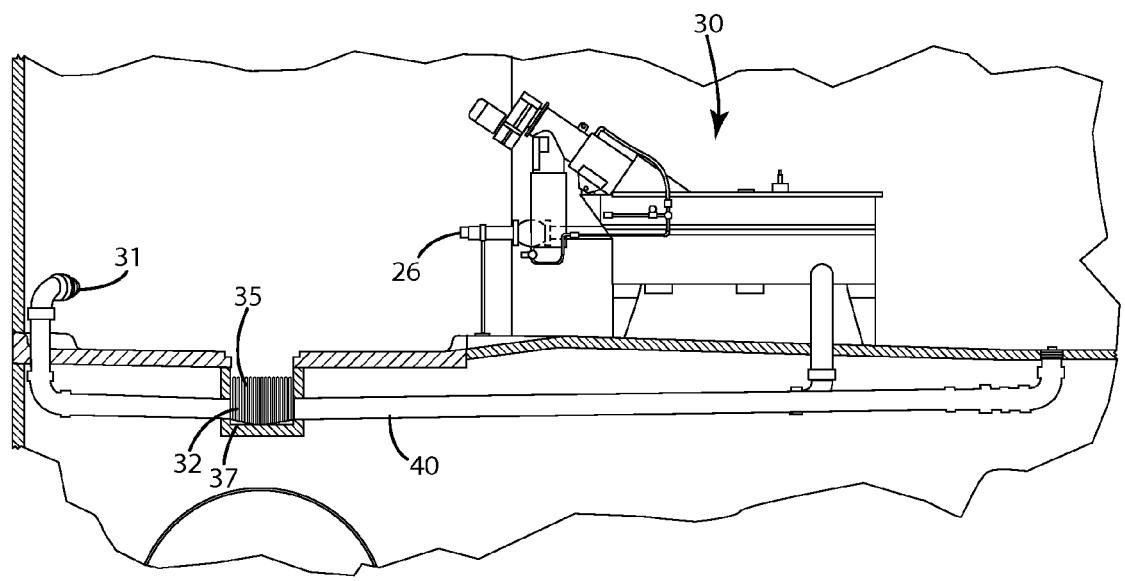
FIG. 5 is a cross-sectional view of the screening station taken along line 5-5 in FIG. 4.

Receiving station 12 provides an entrance and exit to the building, for instance, for septage hauler trucks or other waste transfer vehicles, and an access point for transferring waste from these vehicles into the facility 10 and treatment system. In one embodiment, shown in FIGS. 4 and 5, the access point is a nozzle 26 on an automated screening mechanism 30, or alternatively a nozzle 31 connected to a manual screening mechanism 32. A wide variety of waste materials are accepted at the receiving station 12, including domestic septage, such as septic tank and holding tank material; portable toilet wastes; and waste water treatment plant biosolids. Additional acceptable waste materials include food establishment septage, such as fats, oils and greases; food processing facility waters or waste waters; and other biologically treatable materials.

As noted above, in one embodiment, the receiving station 12 includes a screening station, which may be an automated screening mechanism 30, or a manual screening mechanism 32, for initially separating out some of the inorganic solids from the waste material entering the system. In the illustrated embodiment, the receiving station 12 includes both an automated screening mechanism 30 and a manual screening mechanism 32. The automated screening mechanism 30 may be set as the default screening mechanism, and the manual screening mechanism 32 may be used in circumstances where the automated screening mechanism 30 is shut down or overloaded. The automated screening mechanism 30 may be one of a variety of such systems, and, in the illustrated embodiment, it includes a cam lock inlet 26 for receiving the waste (noted above); a rock trap 33 for collecting and removing heavy objects; a pH meter 34; a flow meter 36 for measuring the amount of septage received by the system; and an auger assembly 38, wherein in one embodiment unwanted solids are captured by an inclined auger screen and separated. In one embodiment, the auger screen includes ¼" (6 mm) perforations. The auger assembly 38 may additionally include a spray wash system to wash the septage and waste water through the auger screen. The collected inorganic solids may be removed from the system for disposal in a landfill, while the screened septage flows via pipe 40 toward the manual screening mechanism 32. Alternatively, the waste material may be fed into the manual screening mechanism 32, shown in FIGS. 4-5. In one embodiment, the manual screening mechanism 32 includes an angled bar screen 35 that separates out unwanted solids for removal and disposal. Along with the material flowing from the automated screening mechanism 30, the remaining waste material flows into a trap 37 below the bar screen 35 and to the preprocessing station 16 via pipe 39.

The preprocessing station 16 separates out additional solids from the waste material. In one embodiment, shown in FIGS. 1 and 9, the preprocessing station 16 is located within a tank 41, such as a 30,000 gallon fiberglass tank. In the illustrated embodiment, the tank is a partitioned tank 41, divided into a first section 42 and a second section 44 by a baffle 46. In one embodiment, the first section 42 of the tank 41 is a basin including an air diffuser 45 that aerates and blends the mixture in the chamber 42. The chamber 42 may be a degrit basin for the settlement of inorganic material, known as grit. The waste that has been screened and degritted cascades over the baffle 46 from the first chamber 42 after the material in the first chamber reaches a predetermined level. In one embodiment, the second chamber 44 may also include one or more air diffusers (not shown) that further aerate the mixture. In addition, the second chamber 44 may include one or more aerobic microorganism generating units 52, described in more detail below, through which the waste material flows.

After flowing through the preprocessing station 16, the blended and aerated waste material mixture flows or is pumped from the preprocessing tank 41 into one of the alkali mixing tanks 51, 53 or 55 and into a screw press system 59. In one embodiment, the system includes at least one alkali mixing tank wherein lime or another alkali is added to the mixture to adjust the pH of the mixture to a desired level. In the illustrated embodiment, the facility 10 includes three 20,000 gallon, fiberglass alkali mixing tanks 51, 53, 55, although the size, number and types of tanks may vary from facility to facility. In one embodiment, the mixture flows or is pumped from the preprocessing station into one of the tanks 51, 53, 55. The system may include valves (not shown) to manually or automatically control which tank the mixture flows into. In the tank 51, 53 or 55, lime or another alkali is added such that the pH of the mixture is raised to a minimum of 12.0. The material is held in the tank and mixed for a predetermined time period, such as twenty-four hours. The tanks 51, 53, 55 may each include one or more air diffusers 57 to aerate and mix the lime and waste material. As noted above, federal regulations require that the effluent is raised to a pH of at least 12 for two hours and at least 11.5 for an additional 22 hours. The pH of the mixture is tested before leaving the tank to confirm that the federal requirements, or another predetermined requirement, has been met.

In one embodiment, a flocculent is added to the lime mixture. The lime mixture may be pumped into a separate flocculation tank where the flocculent is added. In one embodiment, the flocculent is a conventional known polymer flocculent, such as polyacrylamide. The flocculent may be mixed with the waste mixture by fluid flow, a static mixing device or by a mechanical mixing device.

In the illustrated embodiment, the screw press system 59 is a known system that is described in U.S. Pat. No. 6,673,247 to Olson, dated Jan. 6, 2004, which is incorporated herein by reference, although other press systems may be used. In one embodiment, the waste mixture is transported from the tanks 51, 53 or 55 through pipes 61, 63 or 65 to the screw press unit 59. In the screw press unit 59, the waste material may flow into a rotary screen thickener, and then into a screw press that separates solids from the remaining liquid waste material by slowly squeezing the waste mixture along a rotating screw that is surrounded by a perforated screen. The screw may additionally be heated to pasteurize the mixture as it contacts the screw. The remaining solids may be tested for pathogens and removed from the system for soil amendments or other disposal. In one embodiment, the solids removed from this system may meet the EPA's rules and guidelines for exceptional quality Class A Biosolids. The remaining waste material is tested for pH levels, neutralized with an acid, such as citric or muriatic acid, and pumped into the processing station 20. In one embodiment, the neutralized effluent has a pH of 7.5-8.0. Any effluent that does not meet the system's pH tests, pathogen tests or other tests may be pumped or otherwise transported back to one of the alkali mixing tanks 51, 53, 55. In the illustrated embodiment, the effluent may be pumped through pipe 67 back to tank 44.

Figure 6:
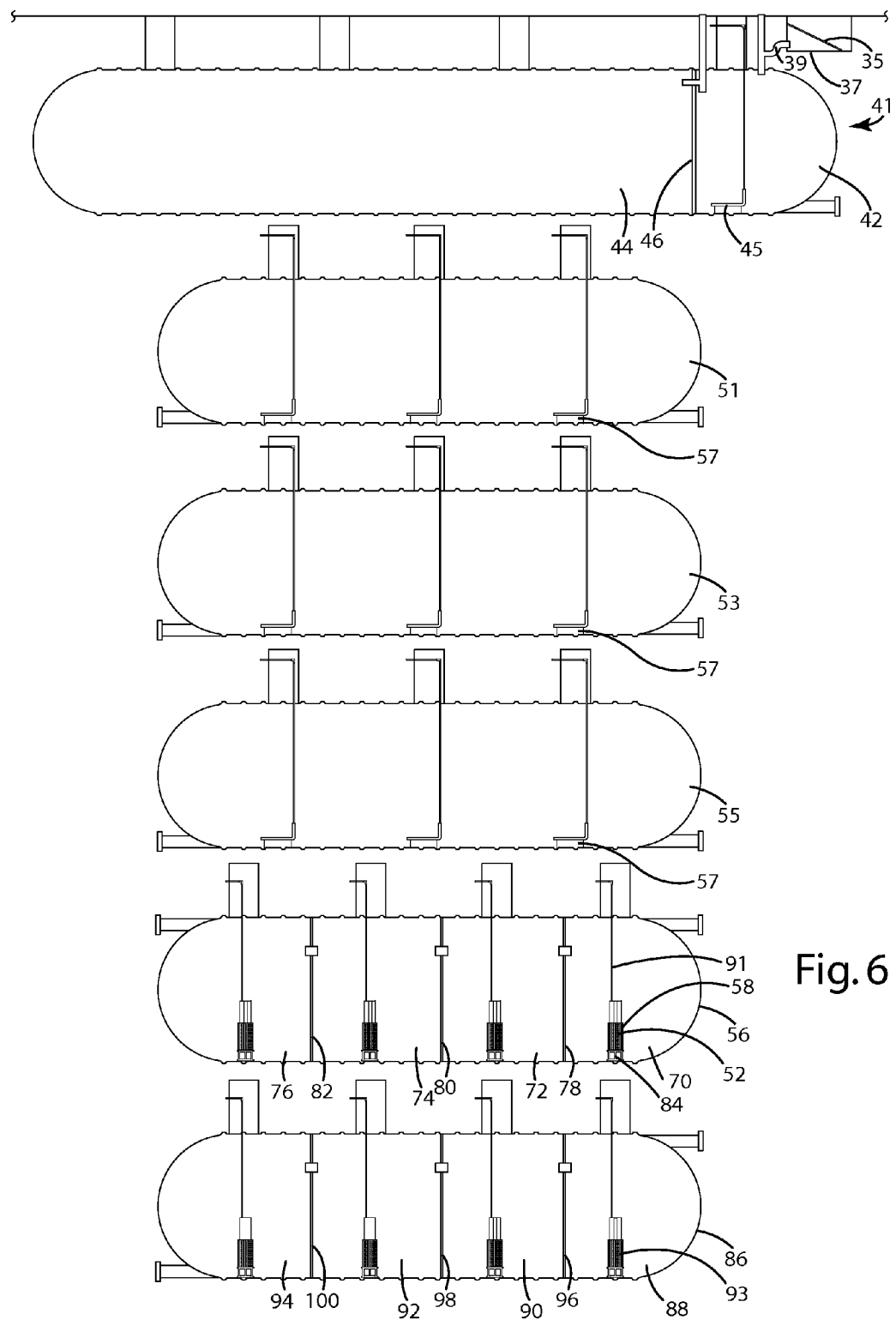
FIG. 6 is a side cross-sectional view of the tanks according to one embodiment of the present invention.

In one embodiment, the processing station 20 includes one or more tanks, with each tank including at least one aerobic microorganism generating unit 52. In the illustrated embodiment, as shown in FIGS. 1 and 6, the processing station 20 includes one 20,000 gallon fiberglass processing tank 56 and a portion of a second 20,000 gallon tank 86. The tank 56 is separated into four sections 70, 72, 74 and 76 by baffles 78, 80 and 82. The tank 86 is also separated into four sections 88, 90, 92 and 94 by baffles 96, 98 and 100. In another embodiment, the processing station 20 may include a plurality of separate, interconnected tanks, which may be formed in various sizes and with a variety of materials. In the illustrated embodiment, the processing station 20 includes all four sections 70, 72, 74 and 76 of tank 56 and two sections 88 and 90 of tank 86. Each of these sections includes an aerobic microorganism generating unit 52 for processing the waste mixture.

The aerobic microorganism units 52, which were originally designed to consume biomat slime from an effluent flowing into a disposal trench, biologically treat the waste mixture as it flows through each unit 52 in each section of the tank 56. These units 52 enable the aerobic treatment of waste without the addition of carbon dioxide and without the production of methane. In one embodiment, the units 52 generally include a media 93, such as a fixed film, that is provided with aerobic and facultative bacteria, which continues to grow and reproduce on the media. The facultative and aerobic bacteria consume organic waste solids as the waste mixture flows through each section of the tank each unit 52. In particular, the aerobic bacteria convert ammonia to nitrites and the facultative bacteria convert the nitrites to nitrates. A variety of different aerobic microorganism units 52 may be used. In one embodiment, the aerobic microorganism units 52 each include a treatment vessel 58 having an air diffuser 84 that aerates and circulates the waste material through the vessel 58. The air diffuser 84 may be connected to an air line 91 that extends out of the tank 56 through one of the ventilation ports 21. In one embodiment, the air diffuser 84 is a fine bubble drive airlift that provides an efficient transfer of oxygen and circulation of wastewater through the vessel 58. The greater amount of oxygen supports a greater number of bacteria providing more rapid digestion of the biosolids. The bacterial host media is positioned within the flow of circulated waste material, and bacteria, including a facultative anaerobic bacteria, are disposed on the media. Facultative aerobic bacteria are bacteria that prefer aerobic conditions, but can operate for a period of time under anaerobic conditions, although much less efficiently under anaerobic conditions. As noted above, they are capable of converting nitrites into nitrogen gas and consuming carbon-based waste material. Thus the effluent released by the unit may include substantially no nitrogen. In one embodiment, the bacteria is a particular type of facultative bacteria blend, described in U.S. Pat. No. 5,531,898 which is incorporated herein by reference.

In one embodiment, the processing station 20 includes six units 52 in the tanks 56 and 86, such that each section 70, 72, 74, 76, 88 and 90 includes one unit 52. The material cascades through each of the units in the tank 56 as the result of the flow provided hydraulic head pressure, or is pumped or otherwise flows into the tank 86 through pipe 87. In one embodiment, the tanks 56 and 86, and/or additional tanks, may be sloped or placed at different elevations to aid in the flow of the mixture. Alternative numbers of units 52 may be disposed in the tanks 56 and 86 as desired to achieve a specific material characteristic.

Operation of the processing station 20 may include the repeated addition of the facultative and aerobic bacteria to at least one of the processing tanks. In one embodiment, the facultative bacteria are produced in a separate hatchery (not shown) within the facility and are added to the large processing tank 56 on a daily basis to maintain a predetermined level of bacteria within the system. The periodic addition of bacteria allows the system to withstand prolonged periods of low levels of waste circulation, wherein the bacteria might otherwise decrease in numbers or in effectiveness.

The processed mixture is pumped or otherwise flows into a quiescence station 22, wherein remaining solids are precipitated out of the mixture and re-circulated through the processing station or removed from the system as exceptional quality Class A Biosolids. In the illustrated embodiment, the quiescence station includes section 92 of tank 86, such that the processed waste material flows directly from the last processing section 90 into the quiescence station 22. Alternatively, the quiescence station may be a separate tank or series of tanks. As illustrated, the quiescence section 92 holds the mixture for a desired period to allow any additional solids to settle out.

Figure 8:
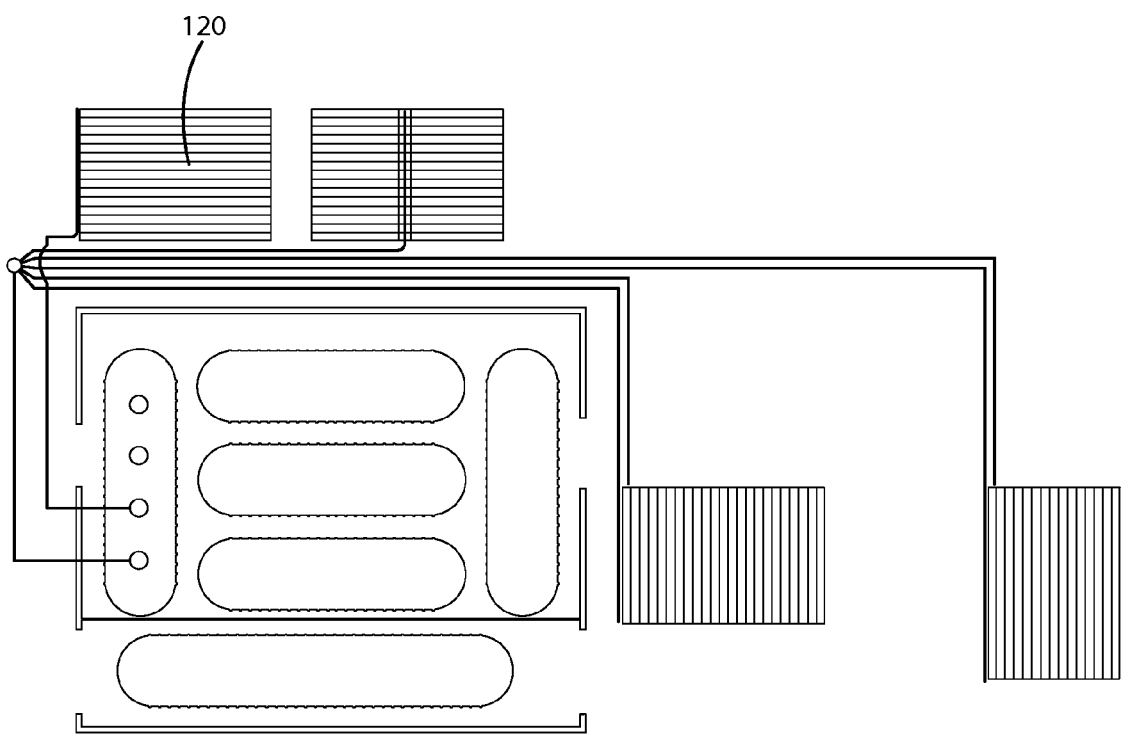
FIG. 8 is a top plan view of the treatment plant and ground water discharge fields according to one embodiment of the present invention.

The remaining waste material flows, or is pumped, into the discharge station 24. In the illustrated embodiment, the discharge station includes section 94 of tank 86, wherein the remaining waste material is held before final discharge. The discharge station may additionally include one or more pumps for pumping the remaining liquid waste material out of the system, or for recycling the liquid back into the facility 10. For instance, the liquid may be pumped into the screening station 12 for use in the spray wash; or the screw press station for use in the alkali mixing tanks, rotary screen thickener or the screw press; or to the hatchery. The waste may be discharged from the facility via pipe 110, which in one embodiment may be connected to a municipal waste water treatment system. In an alternative embodiment, the material is discharged into the ground via a drip irrigation system, or another ground water discharge system, such as the irrigation fields 120 shown in FIG. 8.

In one embodiment, the system 10 additionally includes at least one biofilter 60. As shown in FIGS. 1 and 7, the gas from each station is collected by a system of air ducts 62 and transported to one of the two biofilters 60. The ducts 62 may include fans to transport the gas to the biofilter 60. The gas is transferred to a plenum underneath a biofilter media, which may include a mixture of wood chips, peat moss and additional facultative and aerobic bacteria that filter the air from the system 10 and exhaust carbon dioxide, ammonia and nitrogen into the environment.

In another embodiment, the facility may include an additional biological treatment unit, such as a biomass concentrator reactor ("BCR"). In one embodiment, the BCR is a gravity flow BCR as described in U.S. Pat. No. 6,821,425 to Venosa. The gravity flow BCR generally includes a vessel, shown schematically in FIG. 1, for holding at least one porous barrier, an inlet for water to be treated such that water flows through the BCR, and an outlet for treated water. The water flows through the porous barrier, which may be a porous polyethylene having pore sizes averaging from about 1 to about 50 microns. As the water permeates through the porous walls of the reactor under the force of gravity, microorganisms in the vessel biodegrade contaminants in the water. In the illustrated embodiment, the BCR is located after the discharge station 24, with the remaining effluent being discharged from the BCR or recycled into the system through pipe 120 in the same manner as described above; however, the BCR could otherwise be placed at other positions within the system, such as before or after the processing station 20.

The above description is that of the current embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A method for treating a waste mixture containing liquids and solids, comprising:
   screening the waste to remove an initial amount of the solids;
   settling the waste in a degrit chamber;
   stabilizing the waste in an alkali mixing tank by adding an alkali to the waste to raise the pH to a predetermined level;
   pasteurizing the stabilized waste;
   pressing the stabilized waste in a screw press to remove an amount of the solids;
   processing the waste by flowing the waste through at least one microorganism generating unit; and
   discharging the processed waste.

2. The method of claim 1 wherein the screening step includes an automated screening mechanism containing a spray wash for washing the waste, and wherein at least a portion of the discharged waste is transported to the screening mechanism for use in the spray wash.

3. The method of claim 1 wherein the pressing step includes passing the waste through a rotary screen thickener, and wherein said discharging step includes transferring a portion of the discharged waste to the rotary screen thickener.

4. A method for treating a waste mixture containing liquids and solids, comprising:
   screening the waste to remove an initial amount of the solids;
   settling the waste in a degrit chamber;
   stabilizing the waste in an alkali mixing tank by adding an alkali to the waste to raise the pH to a predetermined level;
   pressing the stabilized waste in a screw press to remove an amount of the solids;
   processing the waste by flowing the waste through at least one microorganism generating unit; and
   discharging the processed waste, wherein the processing step includes transporting the waste through a processing tank containing a plurality of sections divided by baffles, each of the sections including a microorganism generating unit.

5. The method of claim 4 including periodically adding facultative and aerobic bacteria to the processing tank.

6. The method of claim 1 including pasteurizing the waste as it passed through the screw press.

7. A method for treating a waste mixture containing liquids and solids, comprising:
   screening the waste to remove an initial amount of the solids;
   settling the waste in a degrit chamber;
   stabilizing the waste in an alkali mixing tank by adding an alkali to the waste to raise the pH to a predetermined level;
   pressing the stabilized waste in a screw press to remove an amount of the solids;
   processing the waste by flowing the waste through at least one microorganism generating unit; and
   discharging the processed waste, wherein the settling step includes passing the waste through a preprocessing tank having two sections separated by a baffle, wherein first section includes an air diffuser for aerating, blending and degritting the waste.

8. A method for treating a waste mixture containing liquids and solids, comprising:
   screening the waste to remove an initial amount of the solids;
   settling the waste in a degrit chamber;
   stabilizing the waste in an alkali mixing tank by adding an alkali to the waste to raise the pH to a predetermined level;
   pressing the stabilized waste in a screw press to remove an amount of the solids;
   processing the waste by flowing the waste through at least one microorganism generating unit;
   discharging the processed waste, and
   collecting gases that are released during the settling and processing steps and treating the gases in a biofilter.

* * * * *